(12) United States Patent
Boroditsky et al.

(10) Patent No.: US 7,869,716 B1
(45) Date of Patent: Jan. 11, 2011

(54) METHOD AND APPARATUS FOR BROADBAND MITIGATION OF POLARIZATION MODE DISPERSION

(75) Inventors: Mikhail Boroditsky, South Amboy, NJ (US); Mikhail Brodsky, Millburn, NJ (US); Nicholas J. Frigo, Arundel County, MD (US); Peter Magill, Freehold, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1193 days.

(21) Appl. No.: 11/218,061

(22) Filed: Aug. 31, 2005

(51) Int. Cl.
*H04B 10/00* (2006.01)
(52) U.S. Cl. .................... 398/159; 398/29; 398/34; 398/81; 398/147; 398/152; 398/158; 398/162; 356/73.1; 385/11
(58) Field of Classification Search ............... 398/79, 398/81, 105, 147, 152, 158, 159, 184, 192, 398/208, 209, 212–214; 385/1, 11, 27, 37; 359/239, 280, 281, 494, 495
See application file for complete search history.

(56) References Cited

U.S. PATENT DOCUMENTS

| | | | | |
|---|---|---|---|---|
| 5,013,116 A * | 5/1991 | Yamazaki et al. | ............. | 398/79 |
| 6,545,799 B1 * | 4/2003 | McNamara et al. | ..... | 359/337.11 |
| 6,603,890 B2 * | 8/2003 | Khosravani et al. | .......... | 385/11 |
| 6,768,875 B1 * | 7/2004 | Eiselt et al. | ................. | 398/147 |
| 7,295,781 B1 * | 11/2007 | Eiselt et al. | ................. | 398/147 |
| 7,469,491 B2 * | 12/2008 | McCallister et al. | ........ | 375/296 |
| 2001/0008452 A1 * | 7/2001 | Sugihara et al. | ............. | 359/124 |
| 2001/0055437 A1 * | 12/2001 | Khosravani et al. | .......... | 385/11 |
| 2002/0018267 A1 * | 2/2002 | Sun et al. | ..................... | 359/161 |
| 2002/0080447 A1 * | 6/2002 | Fells et al. | .................. | 359/141 |
| 2002/0089724 A1 * | 7/2002 | Nishimoto et al. | .......... | 359/161 |
| 2002/0145787 A1 * | 10/2002 | Shpantzer et al. | ........... | 359/136 |
| 2003/0151789 A1 * | 8/2003 | Hamoir | ..................... | 359/239 |
| 2005/0078964 A1 * | 4/2005 | Takahara et al. | ............ | 398/147 |
| 2005/0244164 A1 * | 11/2005 | Miyashita et al. | ........... | 398/147 |
| 2006/0263094 A1 * | 11/2006 | Setti et al. | .................... | 398/152 |

* cited by examiner

*Primary Examiner*—Li Liu
(74) *Attorney, Agent, or Firm*—Fay Kaplun & Marcin, LLP

(57) ABSTRACT

Described is a method and system for reducing system penalty from polarization mode dispersion. The method includes receiving a plurality of signals at a receiving end of a transmission line, each signal being received on one of a plurality of channels of the transmission line and measuring a signal degradation of at least one of the channels of the transmission line. An amount of adjustment of a polarization controller is determined based on the signal degradation, the amount of adjustment being selected to reduce the polarization mode dispersion. The amount of adjustment is then transmitted to the polarization controller.

15 Claims, 5 Drawing Sheets

Polarization Controller 150

Adjusting Module 520

Receiving Module 510

Fig. 5

METHOD AND APPARATUS FOR BROADBAND MITIGATION OF POLARIZATION MODE DISPERSION

BACKGROUND INFORMATION

Polarization mode dispersion is a limiting factor for high-speed, long haul fiber optic communication. All network operators with high polarization mode dispersion fiber or high bit rate long haul and ultra-long-haul systems face this problem and network routes with older fiber are particularly vulnerable. Due to its stochastic nature, polarization mode dispersion affects channels at random and varies in time. Many polarization mode dispersion compensation techniques have been explored. Each of these is categorized by two characteristics: location of the active mechanism and the number of channels mitigated by a single channel. So far, known compensation techniques are expensive and cumbersome. It is therefore desirable to minimize outage probability of all channels in a cost efficient manner.

SUMMARY OF THE INVENTION

A method for reducing system penalty from polarization mode dispersion. The method includes receiving a plurality of signals at a receiving end of a transmission line, each signal being received on one of a plurality of channels of the transmission line and measuring a signal degradation of at least one of the channels of the transmission line. An amount of adjustment of a polarization controller is determined based on the signal degradation, the amount of adjustment being selected to reduce the polarization mode dispersion. The amount of adjustment is then transmitted to the polarization controller.

A system for polarization mode dispersion mitigation including a transmission line having a transmission end, a receiving end, and a span length, wherein the span length is a distance between the receiving end and the transmission end. A polarization controller is inserted into the transmission line and a feedback channel connects the receiving end of the transmission line to the polarization controller to determine an amount of adjustment of the polarization controller based on a signal degradation measure at the receiving end and transmit the amount of adjustment to the polarization controller.

A polarization controller located in a transmission line having a receiving module to receive a feedback signal including an amount of adjustment for the polarization controller, the amount of adjustment being based on a signal degradation measured at a receiving end of the transmission line and an adjusting module to adjust operation of the polarization controller based on the feedback signal, wherein the amount of adjustment is selected to reduce the polarization mode dispersion.

BRIEF DESCRIPTION OF THE DRAWINGS

FIG. 5 shows an exemplary polarization controller according to the present invention.

DETAILED DESCRIPTION

The present invention provides an apparatus and method to avoid the polarization mode dispersion induced outages using a single polarization controller and a low-bandwidth feedback loop. The invention pertains to the field of long haul fiber optic telecommunications and describes the apparatus and method for broadband mitigation of the polarization mode dispersion-induced system outages in a multi-channel telecommunication system. The apparatus comprises at least one polarization controller inserted into the transmission line at a location in the mid-span and a feedback signal based on the signal degradation measure of the worst channel. The term mid-span should be understood to mean at any location along the transmission line from a transmission end to a receiving end. Preferable locations along the mid-span will be described in greater detail below. The apparatus also includes a feedback channel, which is typically available via the system supervisory channel. In one embodiment, the feedback signal is the pre-FEC (Forward Error Correction) bit error rate, and in yet another embodiment it is a measure of depolarization of the optical signal, such as in a state-of-polarization ("SOP") string length. Based on the values of the feedback signal, the polarization controller is adjusted in order to minimize the feedback signal. Throughout this application, the term minimize is used to mean to reduce. For example, minimizing the feedback signal means to reduce the feedback signal from a current level. It does not necessarily mean that the feedback signal will be reduced to zero.

Figure 1:
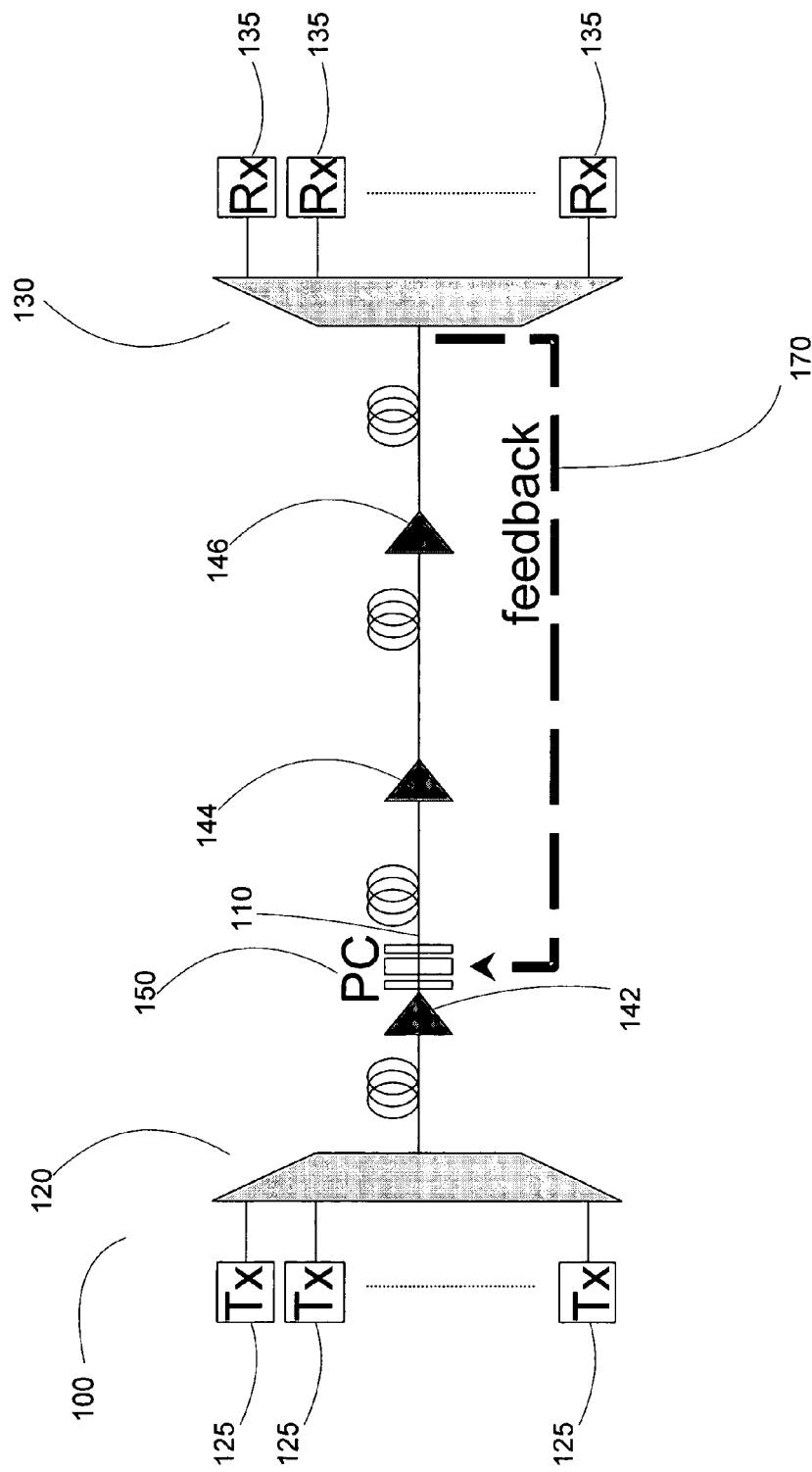
FIG. 1 shows an exemplary system according to the present invention.

Referring to FIG. 1, there is shown an exemplary embodiment of a system 100 according to the present invention. The system 100 includes an optical transmission line 110 having a transmission end 120 with a plurality of transmitters 125 and a receiving end 130 with a plurality of receivers 135. A plurality of signals may be transmitted from the transmitters 125 to the receivers 135 via the transmission line 100. As would be understood by those of skill in the art, the plurality of signals may be transmitted simultaneously through the transmission line 110 using a plurality of channels.

The system 100 typically includes a plurality of optical amplifiers 142, 144 and 146 to amplify the signals as they are being transmitted through the transmission line 110. A polarization controller 150 is located at a point preferably close to a ¼ of a span length from the transmitter 144. Throughout this description, the polarization controller is described as being located near a mid-span amplifier. It is not a requirement of the present invention that the polarization controller be in this location. However, numerical studies have indicated that this is the preferred placement.

A feedback channel 170 connects the receiving end 130 of the transmission line 110 to the polarization controller 150. A feedback signal is transmitted via the feedback channel 170 to adjust, preferably on a continuous basis, the polarization controller 150. The feedback channel 170 made be made available via a system supervisory channel. As described above, the polarization controller is adjusted in order to minimize the feedback signal. Exemplary embodiments of the feedback signal will be described in greater detail below.

Figure 2:
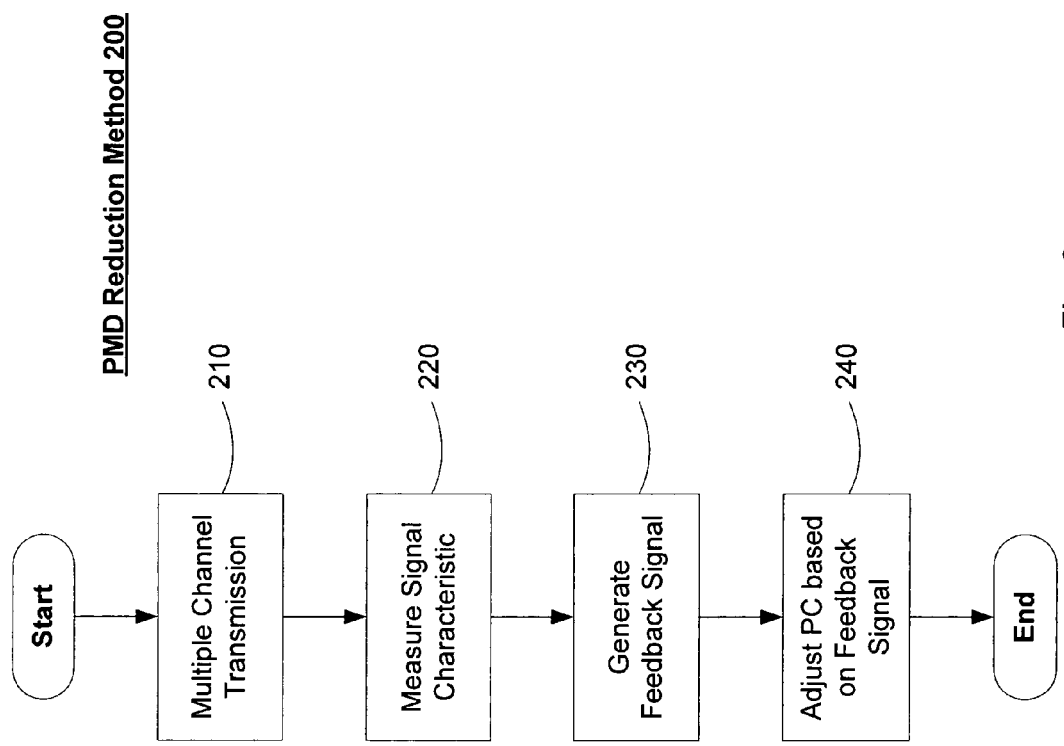
FIG. 2 shows an exemplary method for reducing polarization mode dispersion according to the present invention.
Figure 3A:
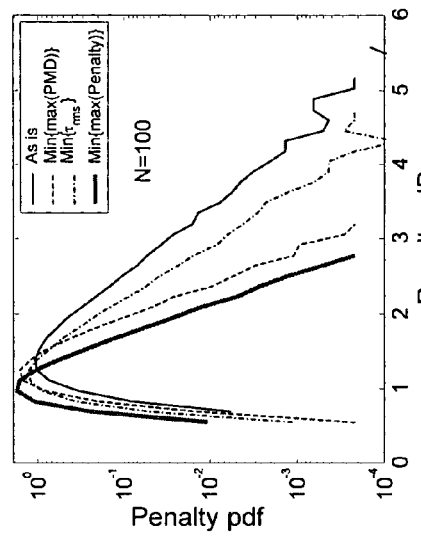
FIGS. 3a-d shows exemplary results for three different feedback methods using a single mid-span polarization controller to reduce the outage probability according to the present invention.
Figure 3B:
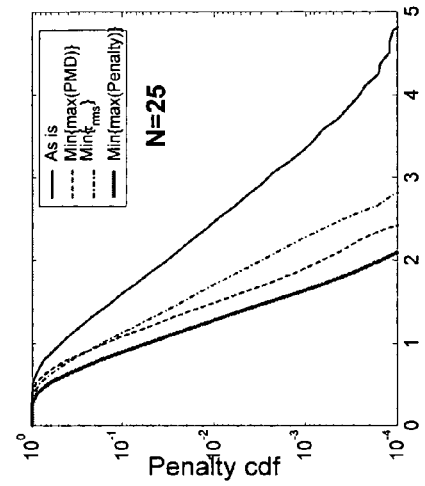
Figure 3C:
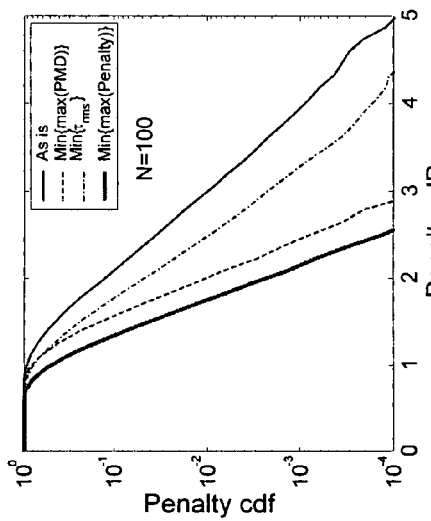
Figure 3D:
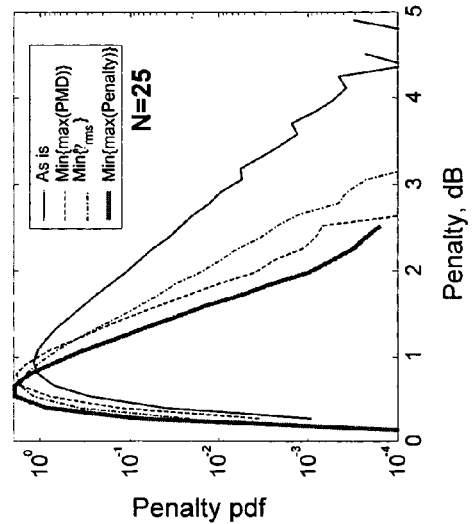

FIG. 2 shows an exemplary method 200 for reducing polarization mode dispersion using the system 100 presented in FIG. 1. In step 210, a plurality of signals are transmitted through the transmission line 110 via multiple channels. In step 220, characteristics of the signals are measured at the receiving end 130. As will be described below, different characteristics may be measured to provide different feedback signals used to adjust the polarization controller 150. In step 230, a feedback signal is generated based on the measured characteristic of the signals. In general, the feedback signal will be based on the measured characteristics of the worst performing channel. However, as will be described below, other channels or groups of channels may be selected to generate the feedback signal.

The feedback signal is transmitted to the polarization controller 150 via the feedback leap channel 170. As described above, the feedback channel 170 may be implemented via the system supervisory channel. The polarization controller 150 being preferably located at a ¼ span point of the transmission line. In step 240, the polarization controller 150 is adjusted based on the feedback signal to minimize the degradation of the signals. The method 200 may continue as long as signals are being transmitted through the transmission line 110 so that the step of adjusting the polarization controller 150 may occur on a continuous basis.

Thus, the present invention provides a broadband mitigation technique which only requires a single low-bandwidth feedback signal going from the receiver side to the polarization controller which is preferably located at the ¼ span point. This compensation scheme is based on the fact that, for example, in a 100 channel system running at outage probability of $10^{-5}$ per channel, there is approximately $10^{-3}$ probability of having an outage in one of the channels. In other words, only 0.1% of the fiber configuration space is bad for transmission. These bad spaces should be avoidable using two degrees of freedom of a single mid-span polarization controller. A polarization controller is inserted close to the mid-span and is continuously adjusted in order to minimize the signal degradation of the worst performing channel (which may be SOP string length or pre-FEC bit error rate), transmitted from the end receiver.

In a typical telecom fiber link, the temporal evolution causes polarization mode dispersion of some channels to rise. The mid-span PMD mitigation technique and boundaries for its performance are described in more detail below.

The fibers may be thought of as hundreds of birefringent pieces connected by polarization rotators. Such a system as a whole has a large configuration space, only one thousandth of which can cause an outage in one of the channels. By using a single mid-span polarization controller 150, as shown in FIG. 1, to avoid bad regions of the parameter space, the outage probability can be reduced by orders of magnitude.

It is unexpected that any compensation technique which involves communication between parts that are not collocated would be desirable. However, given the relatively low cost of the present invention's mitigation technique, and its broadband nature, dedicating a part of the control channel bandwidth to the polarization mode dispersion mitigation is a beneficial solution.

As described above, there are several characteristics of the signals that may be used to generate the feedback signal to control the polarization controller 150. A first example may be the pre-FEC bit error rate, while a second example may be the polarization mode dispersion itself (or a derivative thereof). The pre-FEC bit error rate is straightforward and is easy to measure for each channel. The feedback signal may be based on the pre-FEC signal for the worst channel.

There are several potential optimization functions that may be based on polarization mode dispersion. First, is the polarization mode dispersion itself. The polarization mode dispersion measurement on a working channel is not straightforward, and requires at least two launch polarizations to be used at every frequency, but can be done using the in-situ polarization techniques both at 10 and 40 Gb/s rates. Similar to the technique described above, the feedback signal may be based on the worst channel polarization mode dispersion.

Second, the feedback signal may be based on the measurement of the mean polarization mode dispersion of the channel by interferrometric techniques, using the spectrum of the multiple channels. This technique is based on the assumption that the worst channels will be the key influences on this value. Thus, minimizing the value will have the most effect on the worst channels. The minimization of this value may also be potentially easier to obtain than the minimization of the worst channel polarization mode dispersion.

Finally, it has been shown both theoretically and experimentally, that there is a good correlation between the PMD-induced system penalty and the weighted length of the frequency-resolved SOP "string." These strings can be measured optically using polarization-resolved spectrometry, or electrically, using heterodyne techniques. The advantage of this metric is that it does not require different launch SOP's at the input, and more importantly, it does not distinguish between low-polarization mode dispersion with bad SOP and high polarization mode dispersion and the principal state launch. The feedback based on the optical properties of the signal, rather than the bit error rate has another advantage: it allows distinction between polarization mode dispersion induced impairments and the signal degradation caused by other processes, and allows a remedy to be chosen accordingly.

In the following, the each of the above described feedback mechanisms based on the polarization mode dispersion are considered and their performance is estimated, i.e., the minimization of the polarization mode dispersion in the worst channel, the minimization of the mean square value of the polarization mode dispersion, and the minimization of the largest penalty across all channels is examined (e.g. SOP string). Initially, the SOP string will be discussed. The outage can be estimated using an empirical expression in terms of the modulation-format-specific constant A, splitting ration y, and the ratio of DGD to the bit period τ/T:

$$\varepsilon(\vec{\tau}) = A\gamma(1-\gamma)\left(\frac{\tau}{T}\right)^2 \quad (1)$$

which can be rewritten to relate to the orientation of the polarization mode dispersion and SOP vector on the Stokes sphere as $$\varepsilon(\vec{\tau}) = \frac{A}{4T^2}\left(\vec{\tau}^2 \sin^2\theta\right) = \frac{A}{4T^2}\left(\vec{\tau}^2 - \left(\vec{\tau}\cdot\vec{S}\right)^2\right) \quad (2)$$

where θ is the angle between polarization mode dispersion and SOP vectors in the Stokes space. If the polarization string is defined as a length $L_s$ of the polarization-resolved trace of the output SOP on the Poincaré sphere, $L_s=(\tau/T)\sin\theta$, where 1/T=10 GHz is the bandwidth of the signal, the equation reduces to $$\varepsilon(\vec{\tau}) = \frac{AL_S^2}{4}.$$

However, a more precise description of the penalty has been shown to be:

$$\varepsilon(\vec{\tau}) = \frac{AL_S^2}{4} + BL_S^4 \quad (3)$$

indicating that a SOP string is potentially a good estimator of the polarization mode dispersion induced eye penalty. As described above, this measure is decoupled from the bit error rate performance which can be affected by many other deleterious effects. The "string" measure of polarization mode dispersion does not reflect the effects of polarization-dependent chromatic dispersion. However this may be not crucial, since, statistically, the second order polarization mode dispersion is mostly orthogonal to the polarization mode dispersion vector.

The following considers a fiber with polarization mode dispersion $\tau$ consisting of two halves $\tau=\tau_1 R\tau_2$ such that $\langle\tau_1^2\rangle = \langle\tau_2^2\rangle = \langle\tau^2\rangle/2$. Assuming that rotation R is wavelength independent, and can be parameterized as $R=\exp(\vec{r}\times)$, with vector $\vec{r}$ denoting direction and angle of rotation. It is desired to use the three available degrees of freedom in the rotation matrix R in order to find the system-wide optimal position, that is $$\tau_{max} = \min_R\{\max_\omega|\tau_1 + R\tau_3|\} \quad (4)$$

and compare its distribution over the ensemble of channels to the distribution of the worst channel's penalty that occurs without mitigation:

$$\varepsilon_{max}^0 = \max_\omega\{\varepsilon(\vec{\tau}_1 + \vec{\tau}_2)\} \quad (5)$$

where it is assumed that there is no additional rotation for the second half of the fiber. The distribution of $\tau_{max}$ [or $\epsilon_{max}$] in an uncompensated system can be estimated analytically as $F(\epsilon)^N$, where F is the corresponding cumulative distribution function for single channel PMD [or penalty] and N is the number or channels. Alternatively, the mean square of the polarization mode dispersion can be minimized, looking therefore for the minimum of $$\tau_{max}^{rms} = \min_R\left\{\sqrt{\sum_\omega(\tau_1 + R\tau_2)^2}\right\}. \quad (6)$$

Finally, the penalty can be minimized directly, looking therefore for the minimum of $$\epsilon_{max} = \min_R\{\max_\omega \epsilon(\tau_1 + R\tau_2)\}. \quad (7)$$

Given the arbitrary direction of polarization mode dispersion vectors in this simulation, without loss of generality, the SOP of all channels is set to be the same, (1, 0, 0).

Next is considered the worst case scenario when all channels are independent from each other, making the search for the global optimum more difficult. After the optimal position was found for each of the three figures of merit above, the worst channel's penalty is computed using the Eq. (1) for this position of the mid-span polarization controller.

To test the above, simulations were run for two Non-Return-to-Zero ("NRZ") systems, one with 25 channels (i.e. N=25) and another with 100 channels (i.e. N=100), for a value of polarization mode dispersion of $\tau_{rms}=0.2$ T. In the simulations, empiric coefficients A=40 and B=40 (see Eq. 3) were used to correspond to the Non-Return-to-Zero signal. Two hundred thousand (200000) fiber realizations were performed for each system. Shown in FIGS. 3a-d are the probability density function ("PDF") and the cumulative probability function ("CPF") for the penalty. The PDF and CDF of the worst channel's penalty in a system with 100 statistically independent channels (FIGS. 3 a-b) and 25 statistically independent channels. The worst channel is compared as is to three optimization methods: minimizing the maximum polarization mode dispersion, minimizing the root mean square polarization mode dispersion, and minimizing the maximum penalty.

One skilled in the art would recognize that the FIGS. 3a-d illustrate the feasibility of using the various techniques described above for efficiently mitigating the polarization mode dispersion induced penalty in a multi-channel system with a single polarization controller. Therefore, the polarization mode dispersion induced outages can be reduced by orders of magnitude. One can also see from the FIG. 3 that the feedback based on the direct estimation of the system penalty provides the best improvement in the system outage.

Further study of this polarization technique showed that even better results can be achieved if (i) better optimization algorithm is used and (ii) the polarization controller is placed at ¼ of the span from the transmitter. The simulation supporting these results are presented in FIGS. 4a-b for 25 and 100 channel systems, respectively. The simulation parameters are A=40, B=36 and $\tau_{rms}=0.18$ T. The feedback is the optical signal to noise ratio ("OSNR") penalty. Initially, in FIG. 4a, the PMD-induced penalty CPF in several cases for a wavelength division multiplexing ("WDM") system with 25 channels at 10 Gb/s is plotted. The solid line 410 refers to the unmitigated case. The dashed lines 420-450 refer to simulations over $10^5$ realizations, with the polarization controller at 0.75 span length (line 420), at the transmitter (line 430), at 0.5 span length (line 440) and 0.25 span length (line 450).

Those skilled in art can see that the best performance is achieved when the polarization controller is located at ¼ of the span length. However, the performance improvement is still significant for the polarization controllers located at the transmitter (e.g., at the transmission end of the transmission line) and at ½ of the span length.

Figure 4B:
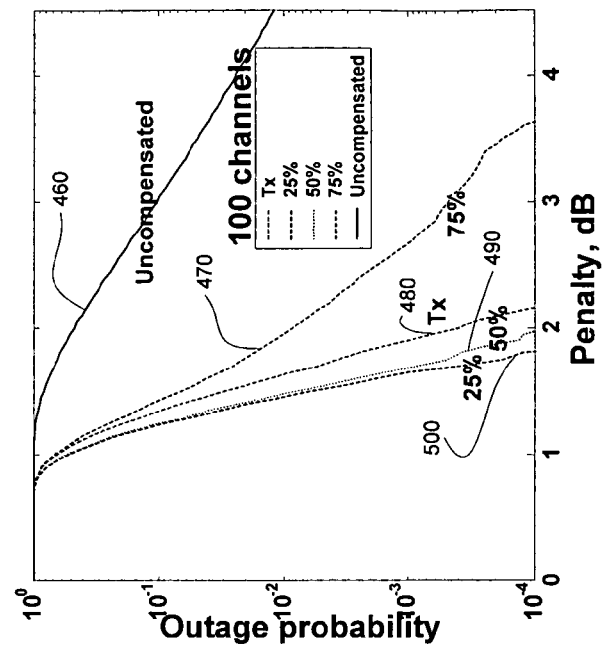
FIGS. 4a-b show a PMD induced penalty CPF for a NRZ system with 25 and 100 channels, respectively, using a mid-span polarization controller according to the present invention.
Figure 4A:
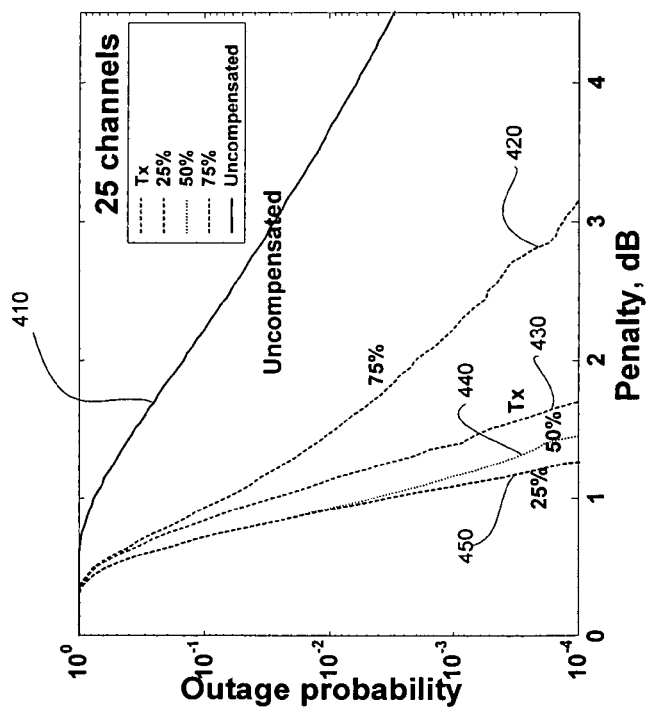

FIG. 4b shows the corresponding results for a system with 100 channels. Specifically, the solid line 460 refers to the unmitigated case. The dashed lines 470-500 refer to simulations over $10^5$ realizations, with the polarization controller at 0.75 span length (line 470), at the transmitter (line 480), at 0.5 span length (line 490) and 0.25 span length (line 500).

FIG. 5 shows an exemplary embodiment of the polarization controller 150 as described above with reference to FIG. 1. Those of skill in the art will understand that the polarization controller 150 may be a combination of hardware and software adapted to perform the functions described above. The exemplary polarization controller 150 illustrated in FIG. 5 may include a receiving module 510 disposed to receive feedback, such as that generated by the feedback channel 170 in step 230 of the exemplary method 200. The polarization controller 150 may further include an adjusting module 520 for adjusting its polarization as per step 240 of the method 200. Those of skill in the art will understand that the receiving module 510 and the adjusting module 520 may be comprised of hardware, software, or a combination thereof.

The present invention has the advantages of overcoming the problems associated with typical compensation schemes. The system and method of the present invention allows for the fiber to "compensate itself." Furthermore, this method does not introduce any additional birefringent elements into the system. The present invention also has the operational advantage of providing predictable and potentially avoidable system outages on the physical layer. The present invention also provides the strategic advantage of providing better use of existing fiber assets and can serve as a base to more advances in distributed polarization mode dispersion mitigation techniques.

It will be apparent to those skilled in the art that various modifications may be made in the present invention, without departing from the spirit or scope thereof. Thus, it is intended that the present invention cover the modifications and variations of this invention provided they come within the scope of the appended claims and their equivalents.

What is claimed is:

1. A method for reducing system penalty from polarization mode dispersion, comprising:
   receiving a plurality of signals at a receiving end of a transmission line, each signal being received on one of a plurality of channels of the transmission line;
   measuring a signal degradation of each of more than one of the channels of the transmission line;
   identifying a worst one of the measured signal degradations; determining an amount of adjustment of a polarization controller based on the worst one of the measured signal degradations, the amount of adjustment being selected to reduce the polarization mode dispersion; and
   transmitting the amount of adjustment to the polarization controller,
   wherein the signal degradation is a polarization mode dispersion, and wherein the amount of adjustment is determined based on a weighted length of a frequency-resolved state-of-polarization string.

2. The method of claim 1, wherein the polarization controller is located substantially at ¼ of a span length from a transmission end of the transmission line.

3. The method of claim 1, wherein the amount of adjustment is transmitted in a feedback signal.

4. The method of claim 3, wherein the feedback signal is transmitted via a feedback channel made available via a system supervisory channel of the transmission line.

5. The method of claim 1, wherein the weighted length is measured optically.

6. A system for polarization mode dispersion mitigation, comprising:
   a transmission line having a transmission end, a receiving end, and a span length, wherein the span length is a distance between the receiving end and the transmission end;
   a polarization controller inserted into the transmission line; and
   a feedback channel connecting the receiving end of the transmission line to the polarization controller to relay a measured signal degradation of each of a plurality of channels of the transmission line, the receiving end identifying a worst one of the measured signal degradations, determining an amount of adjustment of the polarization controller based on the worst one of the measured signal degradations, and transmitting the amount of adjustment to the polarization controller,
   wherein the signal degradation is a polarization mode dispersion, and wherein the amount of adjustment is determined based on a weighted length of a frequency-resolved state-of-polarization string.

7. The system of claim 6, wherein the amount of adjustment is transmitted in a feedback signal.

8. The system of claim 7, wherein the feedback signal is transmitted via a system supervisory channel of the system.

9. The system of claim 6, wherein the polarization controller is inserted at substantially ¼ of the span length from the transmission end.

10. The system of claim 6, wherein the weighted length is measured optically.

11. A polarization controller located in a transmission line, comprising:
    a receiving module to receive a feedback signal including an amount of adjustment for the polarization controller, the amount of adjustment being based on a signal degradation measured at a receiving end of the transmission line, wherein the transmission line has a plurality of channels and the signal degradation of each channel is measured to create the feedback signal, wherein the feedback signal is based on a channel of the transmission line with a largest amount of signal degradation; and
    an adjusting module to adjust operation of the polarization controller based on the feedback signal, wherein the amount of adjustment is selected to reduce the polarization mode dispersion,
    wherein the signal degradation is a polarization mode dispersion, and wherein the amount of adjustment is determined based on a weighted length of a frequency-resolved state-of-polarization string.

12. The polarization controller of claim 11, wherein the feedback signal is received via a feedback channel implemented in a system supervisory channel of the transmission line.

13. The polarization controller of claim 11, wherein the polarization controller is located at substantially ¼ of a span length of the transmission line, the span length being equal to a distance from a transmission end to the receiving end of the transmission line.

14. The polarization controller of claim 11, wherein the feedback signal is a measure of depolarization.

15. The polarization controller of claim 11, wherein the weighted length is measured optically.

* * * * *